United States Patent [19]

Price et al.

[11] Patent Number: 4,612,852
[45] Date of Patent: Sep. 23, 1986

[54] WAFER AGITATOR ASSEMBLY FOR ICE CREAM SANDWICH MACHINE

[75] Inventors: Floyd W. Price, Freehold, N.J.; Richard Vest, Lenoir City, Tenn.

[73] Assignee: Burry-Lu, Inc., Elizabeth, N.J.

[21] Appl. No.: 674,202

[22] Filed: Nov. 23, 1984

[51] Int. Cl.4 .......................... A21C 9/04; A21C 15/00
[52] U.S. Cl. .................................. 99/450.4; 99/450.7; 221/202; 221/205
[58] Field of Search ........................ 99/450.1–450.7, 99/443 C, 644; 198/369, 370; 221/202, 205; 53/230; 426/275, 289; 425/308

[56] References Cited

U.S. PATENT DOCUMENTS

| 2,794,404 | 6/1957 | Rapp | 99/450.4 |
| 3,119,353 | 1/1964 | Roehn, Jr. | 99/450.4 |
| 3,316,860 | 5/1967 | Peterson . | |
| 3,834,119 | 9/1974 | Armitt et al. | 53/230 |
| 4,466,229 | 8/1984 | Gino | 221/205 X |

*Primary Examiner*—Timothy F. Simone
*Attorney, Agent, or Firm*—David A. Jackson; Daniel H. Bobis

[57] ABSTRACT

An ice cream sandwich machine includes a nozzle having a discharge end from which ice cream is extruded; a wafer infeed and delivery assembly cooperating with said nozzle and comprising a pair of wafer trays for feeding wafers against opposite sides of the extruded ice cream and paired, vertically reciprocable wafer pusher blade means cooperating therewith to urge corresponding pairs of said wafers downward for applications to the extruded ice cream bar; an index wheel positioned below the nozzle and having a plurality of pockets therein for receiving the wafers and the ice cream in the assembled form of a sandwich; and a wafer agitator assembly including wafer impact arms for periodically impacting the wafers in the wafer trays, and control arms fixedly connected with respect to the wafer impact arms for controlling the periodicity and impact force of the wafer impact arms of the wafers in the wafer trays in response to periodic movement of the pusher blade means.

9 Claims, 3 Drawing Figures

_4,612,852_

WAFER AGITATOR ASSEMBLY FOR ICE CREAM SANDWICH MACHINE

BACKGROUND OF THE INVENTION

This invention relates generally to ice cream sandwich machines and, more particularly, is directed to an ice cream sandwich machine of the type in which inclined trays are utilized for stacking and continuously supplying wafers on opposite sides of an ice cream nozzle.

Ice cream sandwich machines for automatically and continuously producing completed ice cream sandwiches are well known in the art, for example, as disclosed in U.S. Pat. Nos. 2,794,404; 3,119,353; 3,316,860; and 3,834,119.

In such machines, ice cream is extruded through the end of a vertically-oriented nozzle. At the same time, wafers stacked on inclined trays on opposite sides of the nozzle are continuously supplied to form with the extruded ice cream, ice cream sandwiches. The ice cream sandwich consisting of two wafers with extruded ice cream therebetween is formed and carried to an output conveyor by means of an index wheel positioned below the nozzle and having a plurality of pockets therein which receive the wafers and ice cream in the form of a sandwich. More particularly, pusher blades are provided on opposite sides of the nozzle and reciprocate therealong in the vertical direction so as to intermittently press two wafers on opposite sides of the nozzle into a respective pocket with the comestible ice cream being positioned therebetween. Generally, such machines also include hold down bars positioned at the upper edges of the wafers in the trays to prevent misalignment, and thereby possible damage, thereto.

In order to utilize such apparatus at a maximum speed, while also preventing damage to the ice cream sandwiches, it is important that the wafers have a sufficient rigidity thereto. On the other hand, the wafers must also be sufficiently tender so that the consumer will not be dissatisfied with the ice cream sandwich. These two objectives are therefore contrary to each other. Further, if the wafers are too tender or soft, they may tend to stick to each other in the trays, thereby rendering more of the ice cream sandwiches defective.

OBJECTS AND SUMMARY OF THE INVENTION

Accordingly, it is an object of the present invention to provide novel ice cream sandwich apparatus for preventing wafers in the trays from adhering to each other.

More particularly, it is an object of the present invention to provide ice cream sandwich apparatus that provides periodic agitation of the wafers in the trays.

It is another object of the present invention to provide ice cream sandwich apparatus having wafer agitator means that is relatively simple and inexpensive to manufacture.

In accordance with an aspect of the present invention, in an ice cream sandwich machine of the type comprising a nozzle having a discharge end from which ice cream is extruded, a wafer infeed and delivery assembly comprising a pair of wafer trays for feeding wafers against opposite sides of the extruded ice cream and paired vertically reciprocable wafer pusher blade means for urging said wafers downward toward said ice cream bar, and an index wheel positioned below the nozzle and a plurality of pockets therein for receiving the wafers and the ice cream in the form of a sandwich, wafer agitator means cooperating with said wafer infeed and delivery assembly comprises wafer impact means communicating with said wafer pusher blades for periodically impacting the wafers in the wafer trays; and control means for controlling the wafer impact means to periodically impact the wafers in the wafer trays.

The above, and other, objects, features and advantages of the present invention will become readily apparent from the following detailed description thereof which is to be read in connection with the accompanying drawings.

DETAILED DESCRIPTION OF A PREFERRED EMBODIMENT

Figure 1:
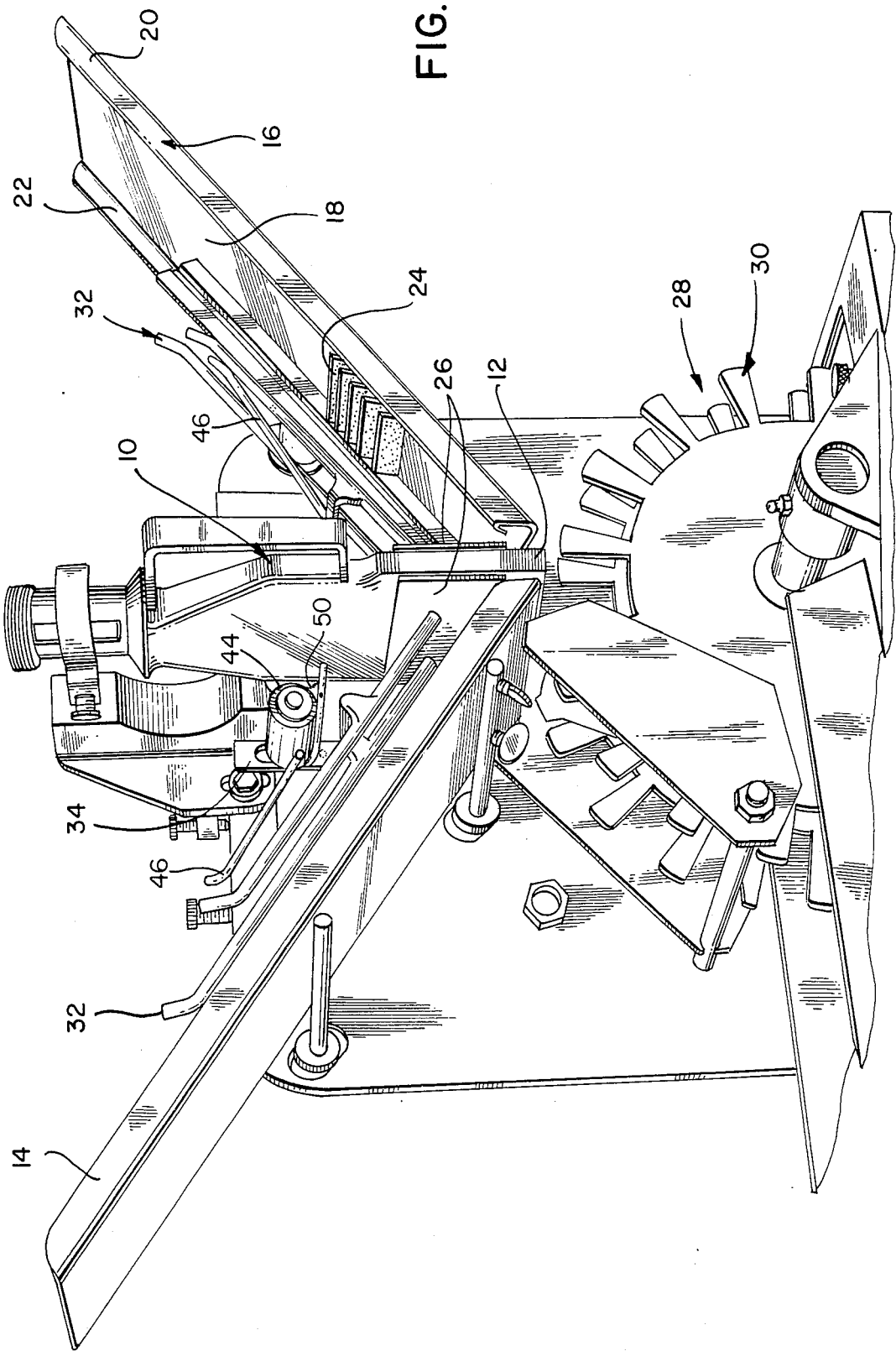
FIG. 1 is a perspective view of a portion of an ice cream sandwich machine according to the present invention.

Referring to the drawings in detail, and initially to FIG. 1 thereof, an ice cream sandwich machine according to the present invention generally includes a nozzle 10 having an open end 12 through which ice cream is extruded. A wafer infeed and delivery assembly comprises wafer trays 14 and 16 which are provided on opposite sides of nozzle 10. Each tray 14 and 16 has a bottom wall 18 and side spaced, parallel side walls 20 and 22. The wafers 24 are stacked within trays 14 and 16.

Figure 2:
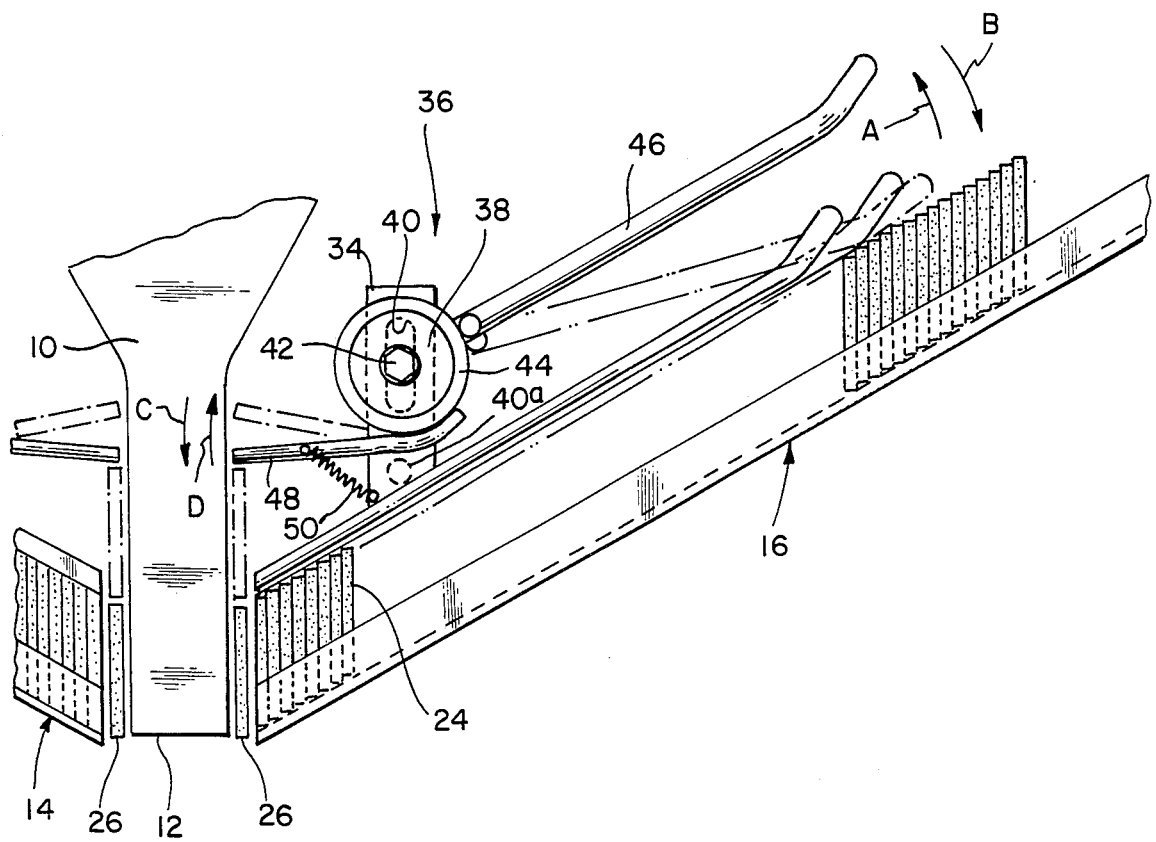
FIG. 2 is a schematic elevational view of a portion of the ice cream sandwich machine of FIG. 1.

As shown in the drawings, trays 14 and 16 are inclined downwardly toward nozzle 10 and terminate on opposite sides of nozzle 10 such that bottom walls 18 thereof are substantially coincident with open end 12 of nozzle 10 and with a space being provided between nozzle 10 and trays 14 and 16 to permit a single wafer to exit from trays 14 and 16 on opposite sides of nozzle 10, as shown in FIG. 2.

The wafer infeed and delivery assembly also includes a pair of pusher blades 26 are also positioned between trays 14 and 16 and nozzle 10 for pushing the wafers on adjacent sides of nozzle 10 downwardly into contact on opposite sides of the extruded ice cream. More particularly, pusher blades 26 are vertically reciprocated between the position shown in the solid lines in FIG. 2, hereinafter designated position A, and the broken lines thereabove in the Figure hereinafter referred to as position B by a pusher blade drive assembly 27, shown schematically in FIG. 3. In position B, a wafer slides from each of trays 14 and 16 to opposite sides of nozzle 10. Pusher blades 26 are then vertically reciprocated to position A shown in FIG. 2 to bias the respective wafers down on opposite sides of the ice cream extruded from the end 12 of nozzle 10 and into a respective pocket 28 of an index wheel 30, as is conventional in the art. The ice cream sandwich formed in the respective pocket 28 is then carried by index wheel 30 to an output conveyor.

In order to maintain the wafers in a fixed position relative to each other and thereby avoid damage when forming the ice cream sandwich, hold down bars 32 are provided along part of the length of trays 14 and 16 and positioned slightly above or in slight contact with the upper edges of wafers 24. Hold down bars are secured on respective hold down posts 34.

In accordance with the present invention, in order to prevent adherence of the wafers in tracks 14 and 16 to each other, and to thereby prevent possible damage during separation of the wafers and formation of the ice cream sandwich by pusher blades 26, a wafer agitator assembly 36 is provided in association with the wafer infeed and delivery assembly for periodically impacting the wafers in each wafer tray.

Each wafer agitator assembly 36 generally includes a hub 38 secured within a longitudinal slot 40 of the respective hold down post 34 at a desired height by means of a nut-bolt arrangement 42. A freely rotatable drum 44 is rotatably fixed on hub 38 by a suitable means, such as bearings (not shown). However, any suitable means well known to those skilled in the art can be utilized for preventing translational movement of drum 44 on hub 38, while permitting rotational movement thereof. For example, a keyed arrangement can be utilized, or a plate can simply be provided at the end of hub 38 and drum 44.

A wafer impact arm 46 extends radially from each drum 44 in a direction generally upstream of the respective tray 14 or 16 and, because of the freely rotatable nature of drum 44, wafer impact arm 46 is pivotally reciprocable in the direction of arrows A and B shown in FIG. 2. As shown therein, wafer agitator arm 46 can therefore impact on the upper surfaces of wafers 24 positioned within the respective tray for preventing adherence therebetween. Of course, the impact is not of a sufficient level to damage the wafers.

Figure 3:
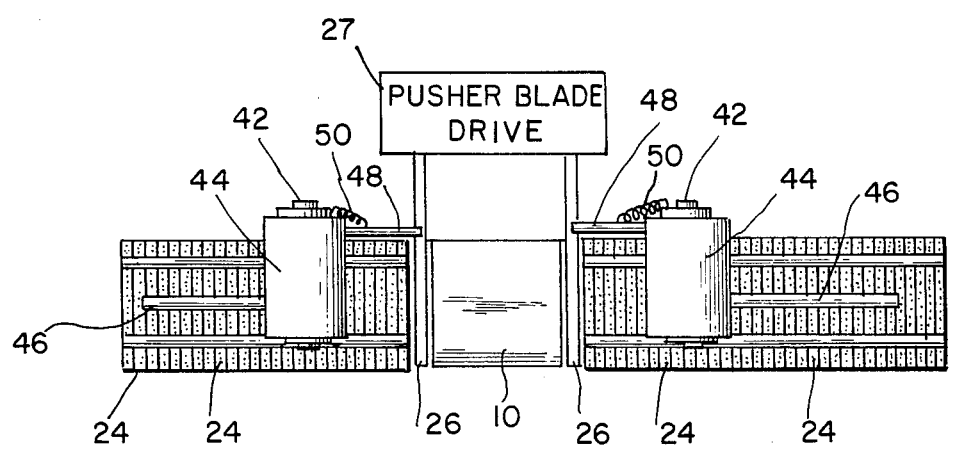
FIG. 3 is a schematic top plan view of the ice cream sandwich machine of FIG. 2.

As shown in FIGS. 2 and 3, each wafer agitator assembly 36 further includes a control arm 48 extending from drum 44 in a direction substantially opposite that of wafer impact arm 46 and having a free end positioned adjacent the side of nozzle 10 and just above the respective pusher blade 26. Because of the rotational nature of drum 44, control arm 48 is pivotally reciprocable in the directions of arrows C and D in a similar manner to that of wafer impact arm 46. Accordingly, control arm 48 is urged in direction D by the upward action of pusher blades 26, and is thereafter urged toward direction C by spring means communicating therewith. Thus, a tension spring 50 may as shown connect control arm 48 to the frame of the housing, for example, to hold down post 34, so as to normally bias control arm 48 in the direction of arrow C in FIG. 2.

In operation, as pusher blades 26 are vertically moved from position A to position B, the upper ends thereof contact the free ends of the respective control arms 48 to bias the latter in the direction of arrow D. This movement, in turn, causes rotation of drum 44, and a consequent pivotal movement of wafer impact arms 46, for example, in the direction of arrow B, so as to impact on the upper edges of wafers 24 located in tracks 14 and 16 to prevent adherence of the wafers. As pusher blades 26 move vertically downward in the direction of arrow C springs 50 bias control arms 48, for example, in the same direction to the position shown in solid lines in FIG. 2. This results in rotation of drum 44 in the opposite direction, and a consequent pivotal movement of wafer impact arms 46 in the direction of arrow A and thereby out of engagement with wafers 24. Upon movement of pusher blades 26 in the opposite direction the operation is repeated.

With the above arrangement, each wafer impact arm 46 is controlled by its control arm 48 to periodically impact the wafers in the wafer trays. Such impact, as previously discussed, however, will not damage the wafers.

It is to be appreciated that various modifications can be made to the present invention by one of ordinary skill in the art without departing from the scope and spirit of the invention as defined by the claims. For example, in place of slot 40, a plurality of apertures, such as aperture 40a shown in FIG. 2, may be provided in hold down post 34. In such case, it is unnecessary to provide hub 38 as a separate unit from drum 44. In other words, a single unitary drum 44 can be provided which would be rotatably mounted within a respective aperture 40a.

Having described a specific preferred embodiment of the invention with reference to the accompanying drawings, it is to be understood that the present invention is not limited to that precise embodiment, and that various changes and modifications may be effected therein by one of ordinary skill in the art without departing from the spirit and scope of the invention as defined by the appended claims.

We claim:

1. In an ice cream sandwich machine of the type including a nozzle having a discharge end from which ice cream is extruded, a wafer infeed and delivery assembly associated with said nozzle comprising a pair of wafer trays for feeding wafers against opposite sides of said extruded ice cream and paired, vertically reciprocable wafer pusher blade means cooperating therewith, and an index wheel positioned below said nozzle and having a plurality of pockets therein for receiving said wafers and said ice cream in the form of a sandwich, wafer agitator means communicating with said wafer pusher blade means comprising:

wafer impact means positioned above said wafers in said wafer trays for inhibiting sticking of adjacent wafers to each other by periodically impacting upper surfaces of said wafers when the latter are aligned in said wafer trays; and control means for controlling said wafer agitator means to periodically impact said upper surfaces of said wafers in said wafer trays.

2. Wafer agitator means according to claim 1;

wherein said wafer impact means includes a pair of wafer impact arms pivotally reciprocable with respect to said pair of wafer trays, respectively, for periodically impacting said upper surfaces of said wafers in said wafer trays.

3. Wafer agitator means according to claim 2;

wherein said pusher blade means are positioned between said pair of wafer trays and said nozzle for biasing wafers from said trays into engagement with said extruded ice cream; and said control means includes a pair of control arms fixedly connected with respect to said of pair of wafer impact arms, respectively, for controlling said pivotal reciprocation of said wafer impact arms in response to reciprocable movement of said pusher blade means.

4. Wafer agitator means according to claim 3;

wherein said pusher blade means biases said control arms in a first direction during reciprocable movement thereof in one direction so that said control arms control said wafer impact arms to impact said upper surfaces of said wafers in said trays;

and further comprising spring means for biasing said control arms in a second, opposite direction during movement of said pusher blade means in the opposite direction thereof.

5. Wafer agitator means according to claim 1; further comprising drum means rotatably secured to a support of said ice cream sandwich machine, and said wafer impact means and said control means fixedly secured to said drum means.

6. An ice cream sandwich machine comprising;
a nozzle having a discharge end from which ice cream is extruded;
a wafer infeed and delivery assembly cooperating with said nozzle and comprising a pair of wafer trays for feeding wafers against opposite sides of said extruded ice cream and paired vertically reciprocable wafer pusher blade means cooperating therewith;
an index wheel positioned below said nozzle and having a plurality of pockets therein for receiving said wafers and said ice cream in the form of a sandwich; and
wafer agitator means positioned above said wafers in said wafer trays and communicating with said wafer pusher blade means for inhibiting sticking of adjacent wafers to each other by periodically impacting upper surfaces of said wafers when the latter are aligned in said wafer trays.

7. An ice cream sandwich machine according to claim 6; wherein said wafer agitator means comprises:
wafer impact means pivotally reciprocable with respect to said pair of wafer trays for periodically impacting said upper surfaces of said wafers in said wafer trays; and
control means fixedly connected with respect to said wafer agitator means for controlling said wafer impact means to periodically impact said upper surfaces of said wafers in said wafer trays.

8. An ice cream sandwich machine according to claim 7;
wherein said pusher blade means are positioned between said pair of wafer trays and said nozzle for biasing wafers from said trays into engagement with said extruded ice cream; and
said control means controls said pivotal reciprocation of said wafer impact arms in response to reciprocable movement of said pusher blade means.

9. An ice cream sandwich machine according to claim 8;
wherein said pusher blade means biases said control means in a first direction during reciprocable movement thereof in one direction so that said control means controls said wafer impact means to impact said upper surfaces of said wafers in said trays;
and further comprising spring means for biasing said control means in a second, opposite direction during movement of said pusher blade means in the opposite dirrection thereof.

* * * * *